Aug. 12, 1958        N. F. HAWTHORNE ET AL        2,847,160
                      CALCULATING MACHINE
Filed March 31, 1955                          8 Sheets-Sheet 8

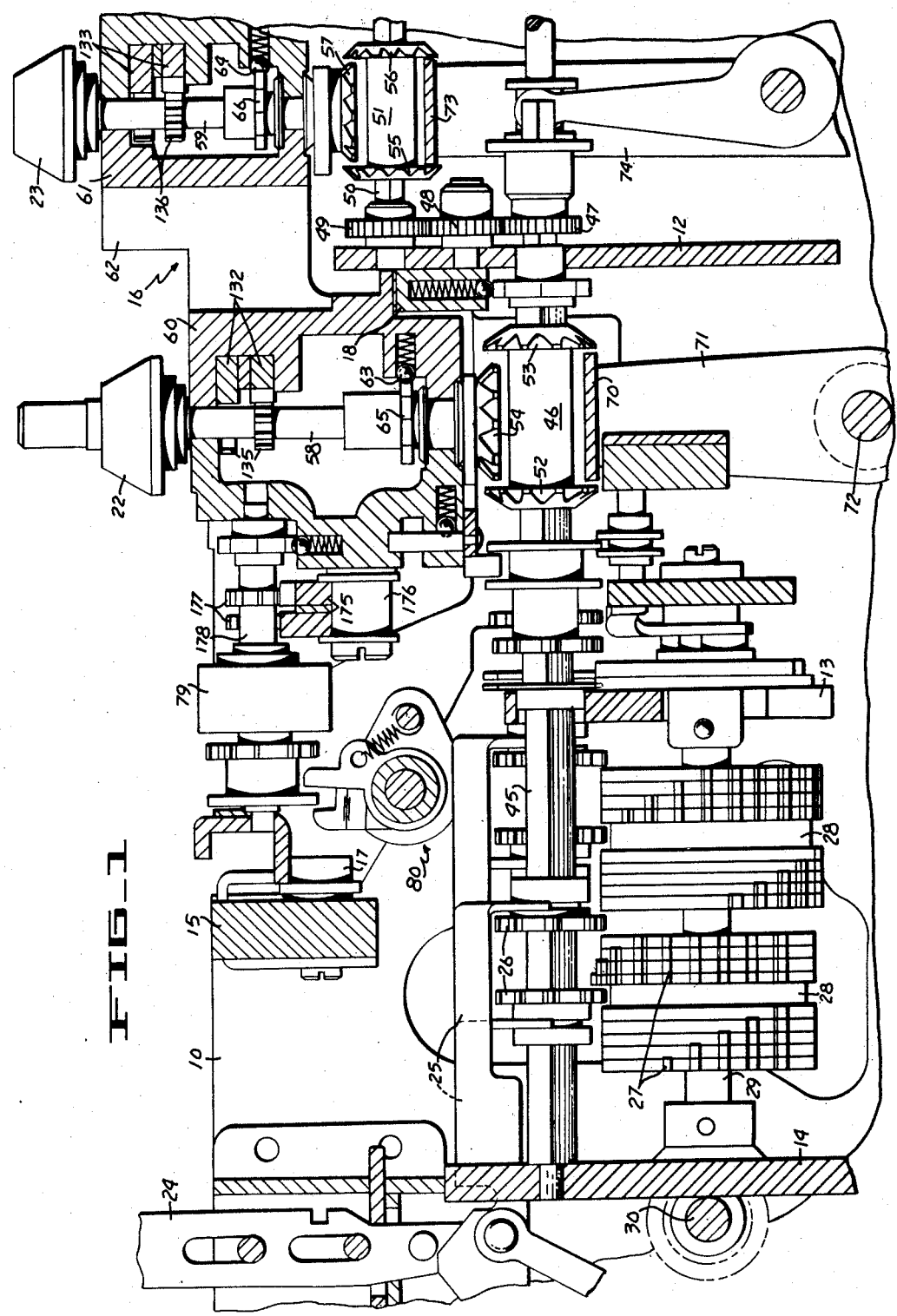

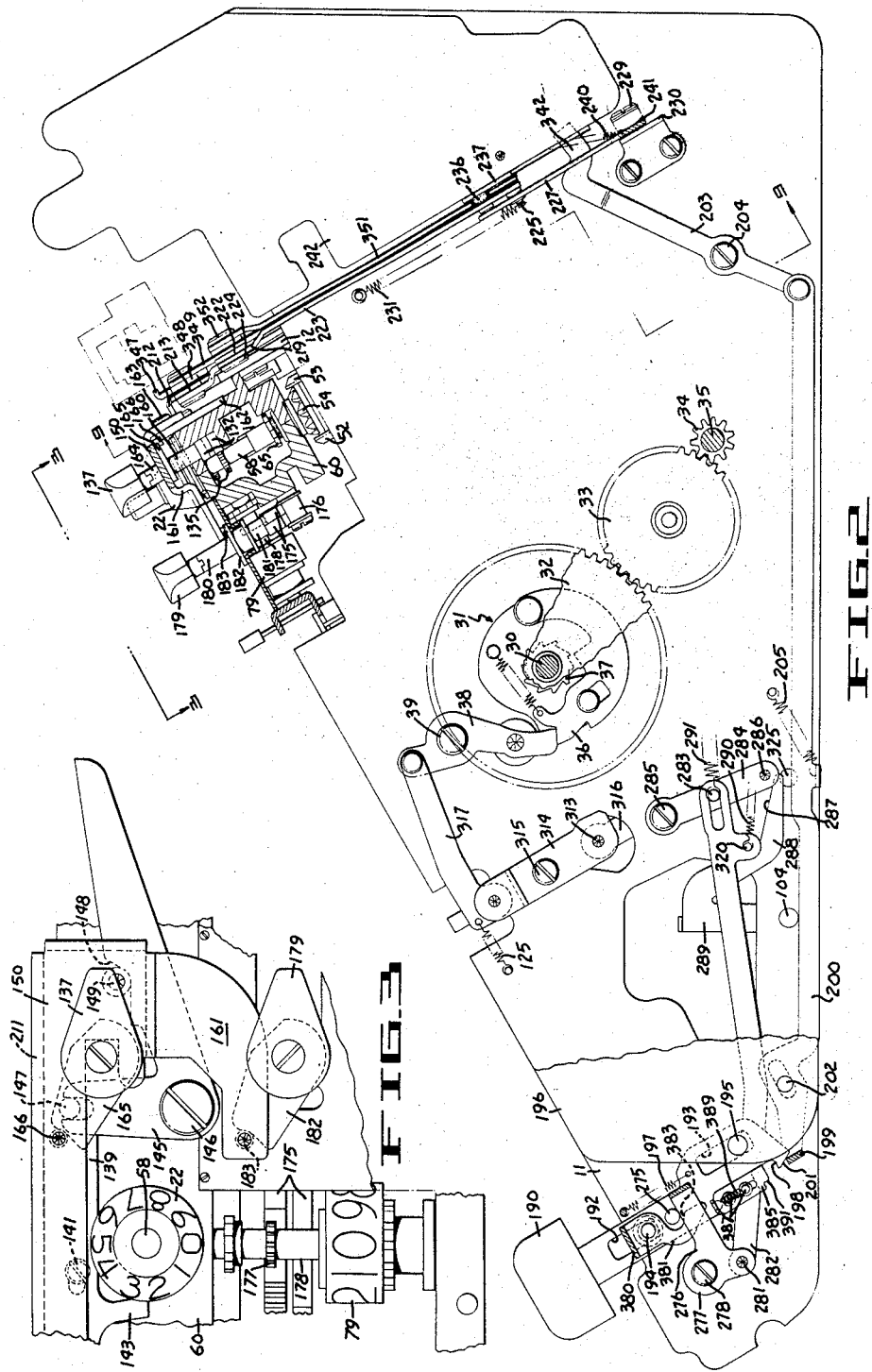

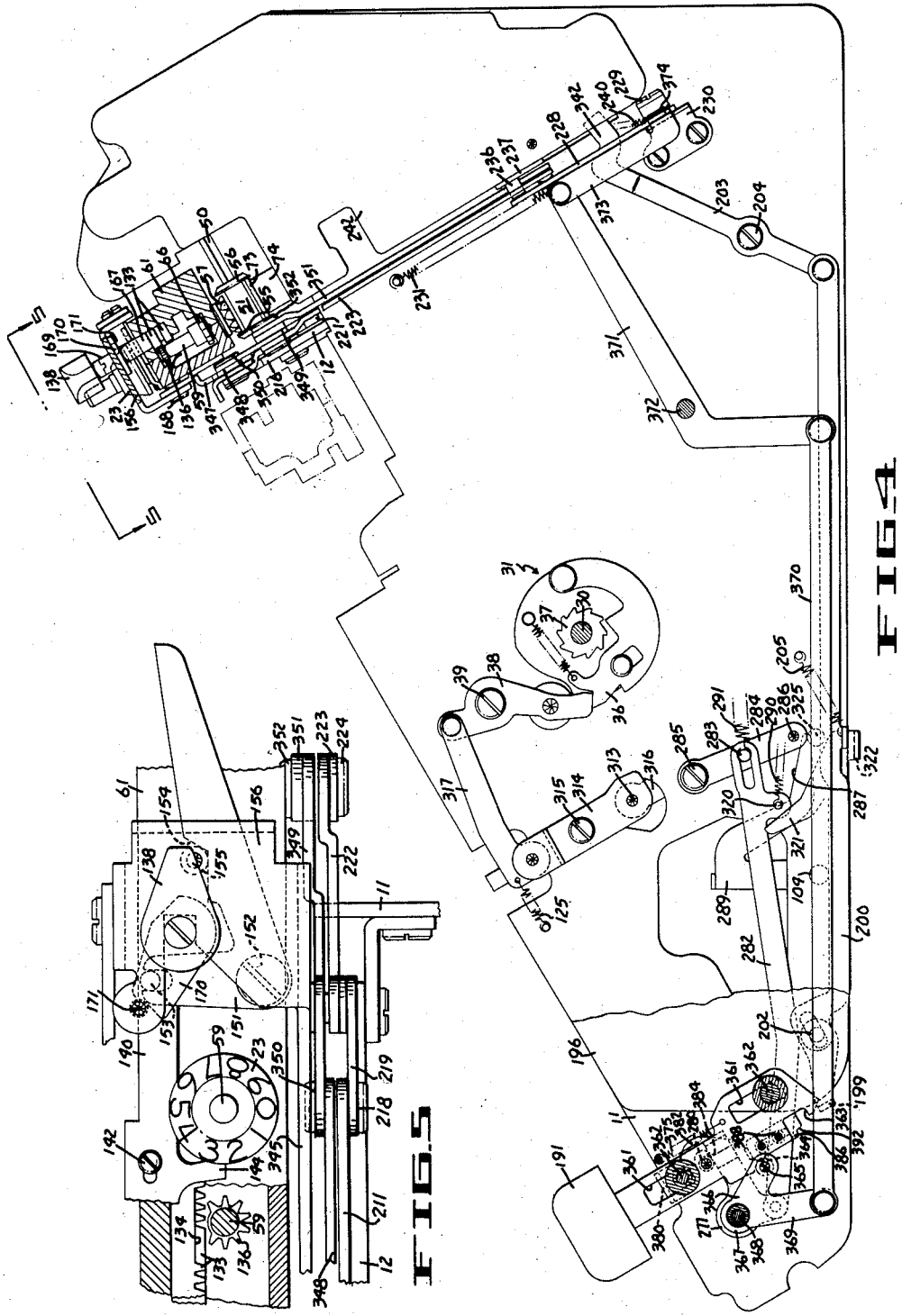

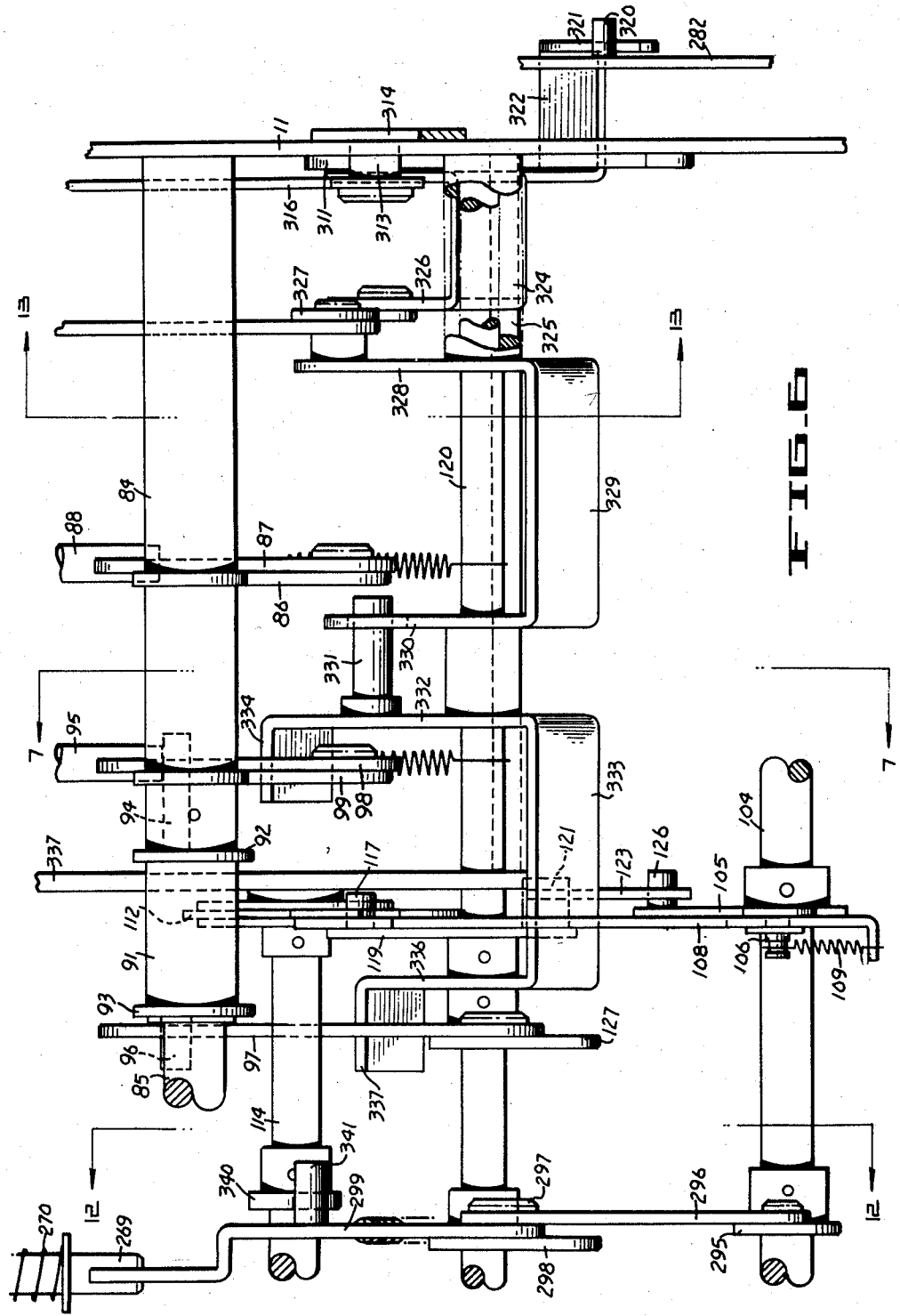

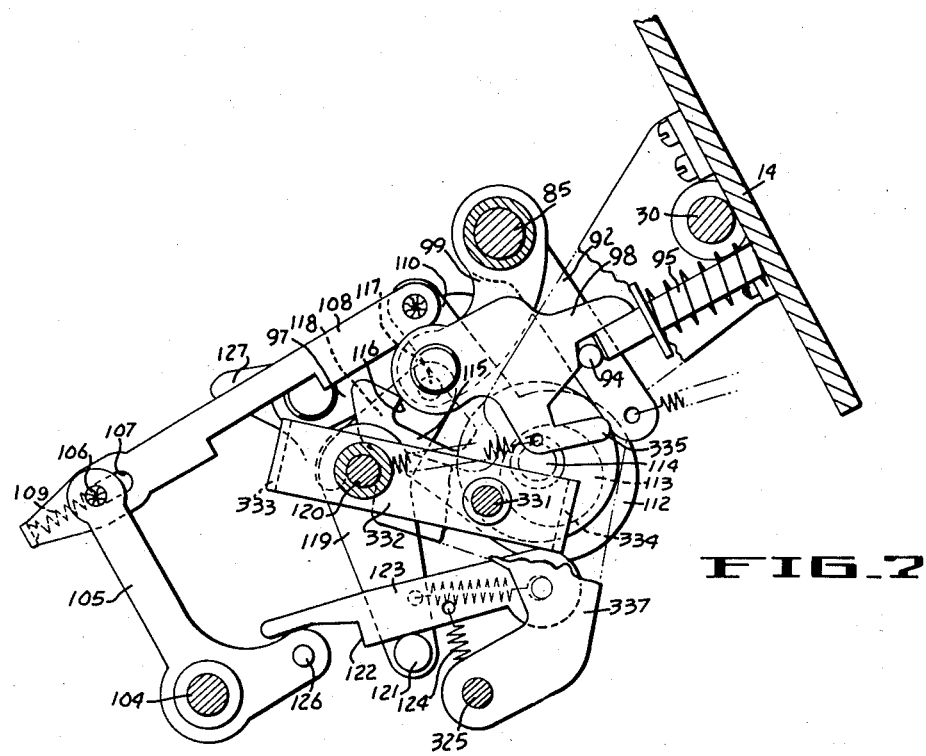
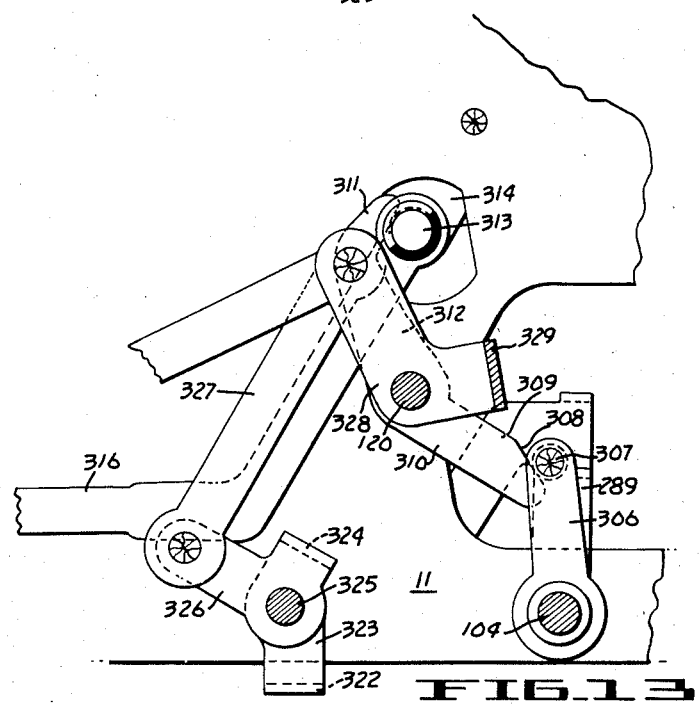

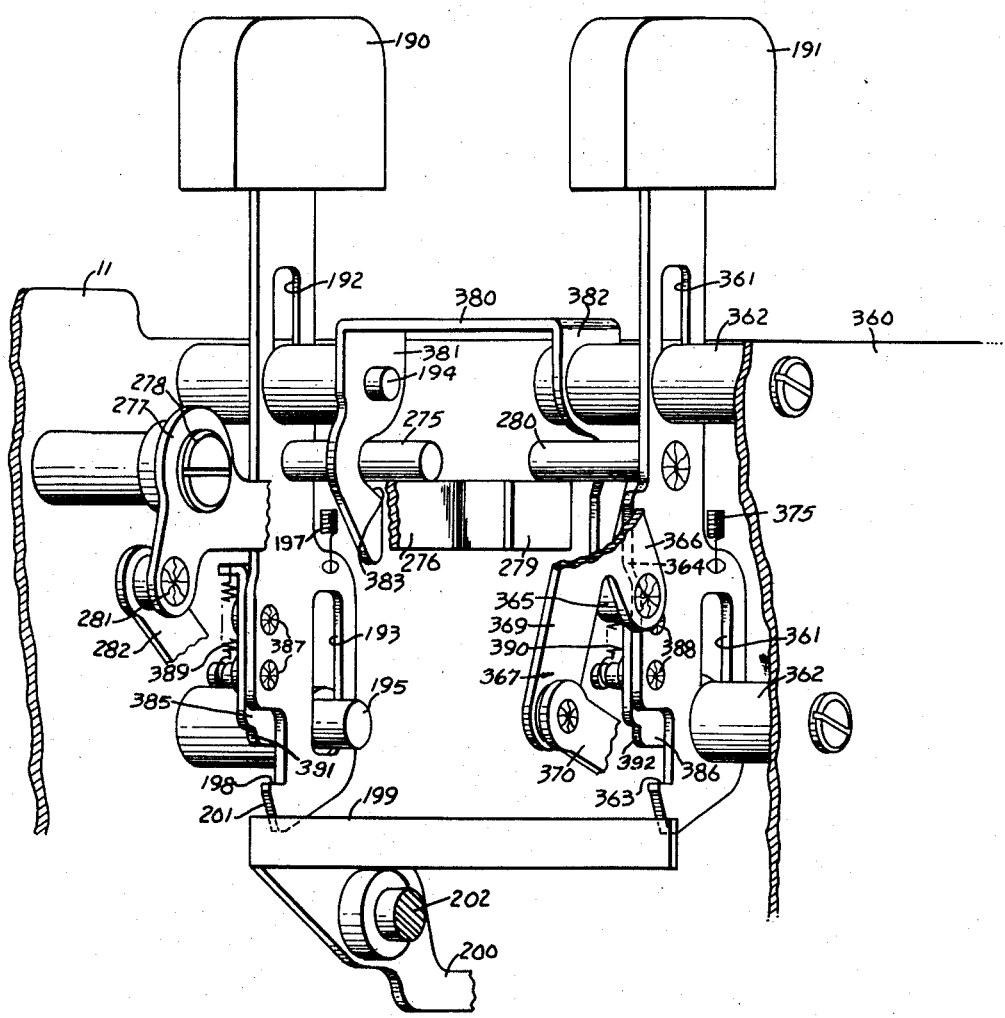
FIG_8

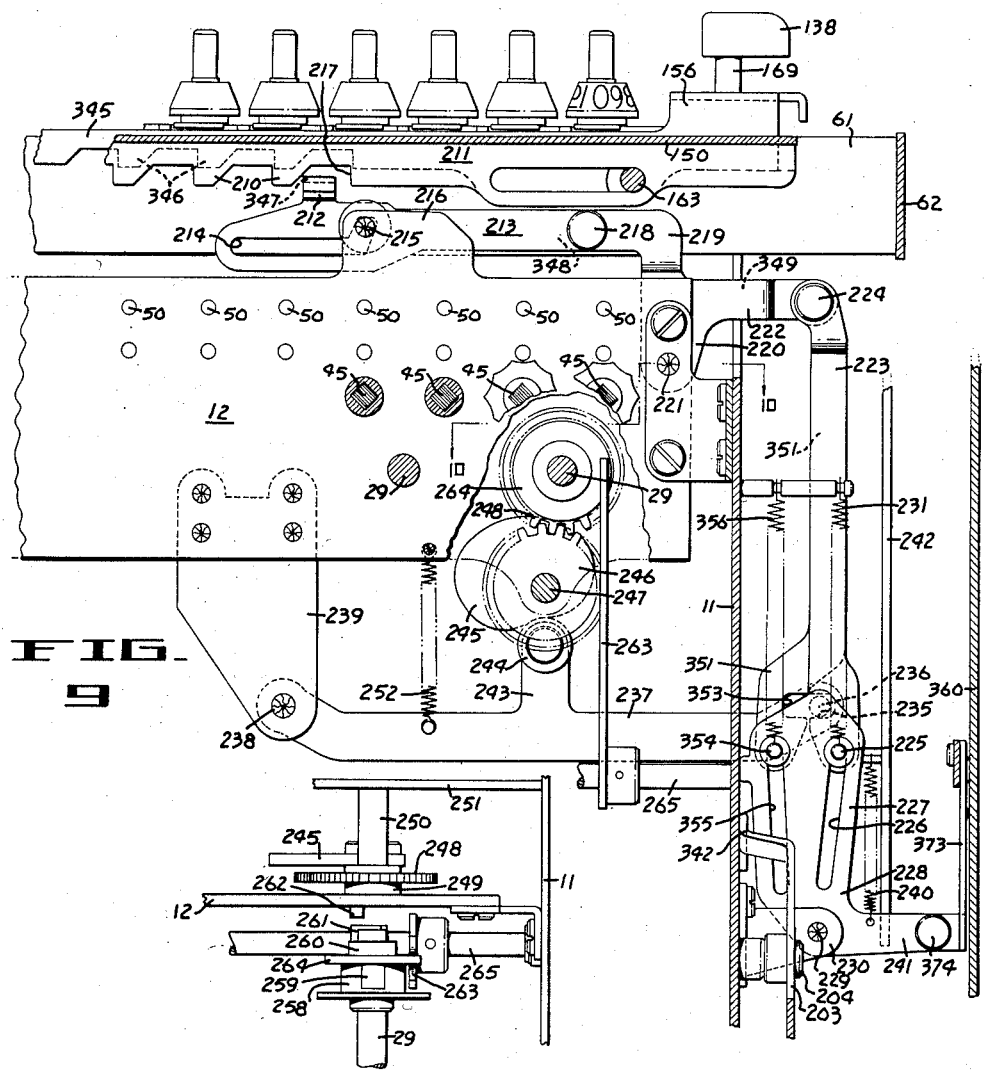

નુ2,847,160
Patented Aug. 12, 1958

United States Patent Office

2,847,160
CALCULATING MACHINE

Nathaniel F. Hawthorne, Alameda, and Nils H. Bergfelt, San Francisco, Calif., assignors to Friden, Inc., a corporation of California Application March 31, 1955, Serial No. 498,218

17 Claims. (Cl. 235—63)

The invention relates to calculating machines having a shiftable carriage and more particularly to means selectively operable to restore each of a series of numeral wheels in one or more registers to 0 registration in any ordinal position of the carriage.

In calculating machines having an ordinally shiftable register carriage it is necessary to zeroize the numeral wheels in one or all of the registers in preparation for the registration of the result of an ensuing computation. In known machines of the type to be described, the initiation of a resetting operation effects a shifting of the register carriage to an end position followed by a zeroizing or resetting of the numeral wheels therein. In most machine operations, the end positioning of the carriage is superflous, since a subsequently desired operation may require the carriage to then be repositioned in other than the end position before the computation begins, thus necessitating an additional operation and/or cycles of the machine. According to the present invention the desired register in which a result is to be entered may be selectively reset to 0 registration without a return of the carriage to a selected position.

It is an object of the invention to provide a calculating machine with an improved means for restoring a register to normal condition between successive machine operations.

Another object of the invention is to provide improved zero resetting means for the shiftable numeral wheels of a calculating machine whereby the resetting means is operated in any ordinally shifted position of the carriage.

Another object of the invention is to provide a calculating machine having a plurality of registers with improved means for resetting the numeral wheels in a selected one of such registers to 0 registration.

Another object of the invention is to provide an improved zero resetting mechanism for a calculating machine by means of which the numeral wheels of one register or another in a shiftable carriage may be selectively zeroized in any ordinally shifted position of the carriage.

Other objects and advantages will be apparent from the following disclosure of a preferred embodiment as illustrated in the accompanying drawings in which:

Fig. 1 is a fragmentary sectional elevational view of the rear portion of the machine;

Fig. 2 is an elevational view of the right side control frame member showing the zero resetting key for the lower register and including the main drive clutch;

Fig. 3 is a fragmentary plan view of the lower register taken on the line 3—3 of Fig. 2;

Fig. 4 is an elevational view of the right side control frame member including a fragmentary showing of the auxiliary frame member, the view being taken immediately to the left of the extreme right side frame member;

Fig. 5 is a fragmentary plan view of the upper register, the view being taken on line 5—5 of Fig. 4;

Fig. 6 is a plan view of the carriage shift control mechanism and the zero resetting control means;

Fig. 7 is an elevational view of the carriage shift control mechanism, the view being taken on line 7—7 of Fig. 6;

Fig. 8 is a view in perspective of the zero resetting keys for both registers and a fragmentary showing of the right side control frame member and the extreme right-hand frame member;

Fig. 9 is a sectional elevational view showing the resetting clutch and cam, the zero resetting control racks, and the mechanism to selectively control the zero resetting of either register, the view being taken on line 9—9 of Fig. 2;

Fig. 10 is a plan view of the zero resetting clutch and cam taken on line 10—10 of Fig. 9;

Fig. 13 is a fragmentary sectional elevational view of the left side of the right side control frame member, the view being taken on line 13—13 of Fig. 6.

Figure 11:
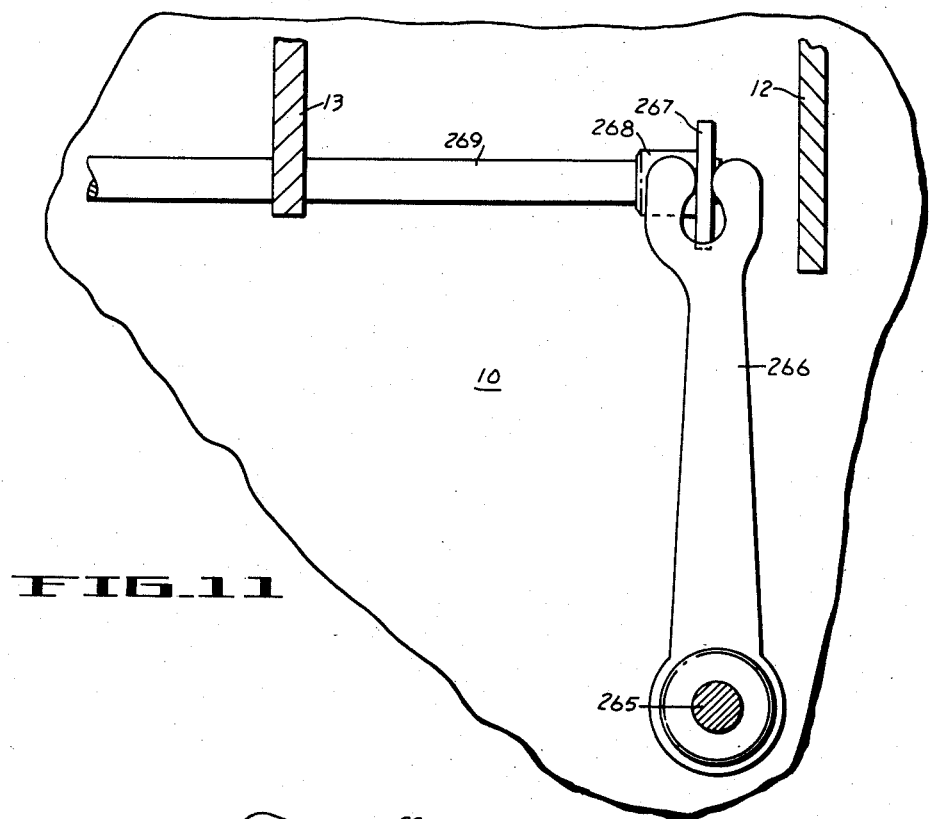
Fig. 11 is an elevational view of the rearward end of the zero resetting clutch engaging rod.

The invention is disclosed as embodied in a calculating machine of the Thomas type as illustrated in the copending application of Nils H. Bergfelt, Ser. No. 458,883, filed September 28, 1954, and the copending application of Nathaniel F. Hawthorne, Ser. No. 476,349, filed December 20, 1954. The general arrangement and operation of such a machine is well known, having a cyclically driven unidirectionally operable actuating means as described in Patent No. 2,229,889, issued to Carl M. Friden on January 28, 1941.

Generally the machine comprises a frame and a carriage mounted for lateral shifting movement on the frame. The carriage mounts the registers of the machine comprising two accumulator registers and the revolutions counter register, while the frame provides a support for the various mechanisms for entering values in the registers. The frame includes the base (not shown) which supports left and right side frame members 10, 11 (Figs. 1 and 2) mounted thereon. Side frame members 10 and 11 are connected by various cross-frame members 12, 13, 14 and 15 which serve to mount various mechanisms referred to hereinafter. The register carriage indicated generally at 16 (Fig. 1) is mounted for endwise shifting movement by rollers 17 on cross-frame member 15, bar 18 on cross-frame member 12 and at its rear by a suitable means not shown, the carriage being shiftable laterally of the machine in either direction to various ordinal positions under the control of mechanism fully described in the aforementioned application Ser. No 476,349 or by any conventional means such as that disclosed in the Patent No. 2,650,761, issued to Anthony B. Machado, September 1, 1953.

Selecting and actuating mechanisms

The values to be introduced into the accumulator numeral wheels 22 and 23 are selected by means of a plurality of banks, or orders, of settable value keys 24, one of which banks is illustrated in part in Fig. 1. Each bank of keys 24 cooperates with selecting mechanism including a pair of parallel spring-urged slides 25 mounted for endwise movement to position gears 26 selectively with respect to stepped teeth 27 of the associated actuating cylinder 28 in accordance with the value of the depressed key. One gear 26 of each ordinal pair and the associated slide 25, cooperate with the value keys 24 from 1 to 5 and the left-hand set of teeth 27 on the associated cylinder 28, as viewed in Fig. 1, while the other gear 26 and slide 25 cooperate with value keys 24 from 6 to 9 and the right-hand set of teeth 27 on such cylinder.

Cylinders 28 (Fig. 1) are mounted on actuating shafts 29 having suitable bevel gear connections with transverse drive shaft 30 which is suitably journalled in side members 10 and 11. Each shaft 29 serves for two adjacent orders of the machine and has a pair of cylinders 28 mounted thereon. Shaft 30 and shafts 29 are driven cyclically from a motor through the clutch indicated generally at 31 (Fig. 2), which is driven by suitable gearing 32, 33 and 34 from motor shaft 35. Clutch 31 is engaged or disengaged in a conventional manner by oscillation of spring-urged clutch pawl or dog 36 mounted for rotation with shaft 30, and with respect to ratchet 37 integral with gear 32 journalled on shaft 30 and driven from motor shaft 35. Clutch control lever 38 pivoted at 39 on right side control frame member 11 determines engagement or disengagement of the clutch by releasing or engaging the nose of pawl 36 in the full-cycle position thereof.

From the above description it is seen that a value set in the machine by depression of keys 24 will be transmitted to gears 26 by the teeth 27 of cylinders 28 during cyclic operation of the clutch. Each pair of gears 26 is slidably mounted on a square shaft 45 (Fig. 1) supported in transverse brackets 13, 14 and extending rearwardly of the machine through bracket 13 and spool 46 slidably and non-rotatably mounted thereon. Adjacent its rearward end, each shaft 45 is journalled in transverse bracket 12 and carries pilot gear 47 slidably and non-rotatably mounted on an extended portion thereof for selective engagement or disengagement with idler gear 48 enmeshed with gear 49 secured on square shaft 50, which shaft is journalled at its forward end in transverse bracket 12 and extends rearwardly through spool 51 having its rear end journalled in a transverse bracket (not shown). Spools 46 have opposite bevel gears 52, 53 on either end thereof for cooperation with gears 54 on numeral wheel shafts 58. Similarly, each spool 51 carries opposed bevel gears 55, 56 positioned for cooperation with gears 57 on numeral wheel shafts 59. Therefore, when one or the other set of gears 52, 53 is engaged with gears 54, numeral wheels 22 will be rotated counter-clockwise or clockwise to register a number of increments positively or negatively in accordance with the value of the depressed keys 24 in the aligned bank of keys. In the normally engaged position of the pilot gears 47 and upon selective engagement of one or the other set of gears 55, 56 with numeral wheel gears 57, the same values as those registered in numeral wheels 22 will be registered positively or negatively in the ordinally aligned numeral wheels 23. Numeral wheel shafts 58 and 59 are ordinally arranged and journalled in respective frames 60 and 61 of carriage 16, which frames are maintained in spaced-apart relation by similar end frames 62. The numeral wheel dials 22 and 23 are detented in each rotated position thereof by the engagement of respective spring-urged balls 63 and 64 with notches in star wheels 65 and 66 secured on respective shafts 58 and 59.

Plus-minus gate 70 is positioned between gears 52, 53 and is mounted at either end by suitable similar arms 71 secured on shaft 72 to control the engagement of the gears with the numeral wheel gears 54. Similarly, plus-minus gate 73 extends transversely of the machine in a position between gears 55, 56 and is mounted at either end by similar arms 74 on a transverse shaft (not shown) for control thereby. Thus, by rocking either or both gates 71 and 74 clockwise or counter-clockwise, respective gears 52, 53 and/or 55, 56 may be moved into engagement with respective dial shaft gears 54, 57. Any suitable control means may be provided for controlling the rocking movement of the gates 70 and 73, and for simultaneously enabling the drive through clutch 31, as for example, the plus and minus keys disclosed in the aforementioned application Ser. No. 458,883. Conventional means are provided for centralizing gates 70 and 73 and the respective gears 52, 53 and 55, 56 in the central neutral position shown in Fig. 1.

Revolutions counter

The number of actuations of accumulator numeral wheels 22 and/or 23 are registered either positively or negatively in revolutions counter numeral wheels 79 in a conventional manner (Fig. 1) under the control of a revolutions counter actuator indicated generally at 80 and fully described in said Patent No. 2,229,889 to enter single increments in the active order of the revolutions counter.

Carriage shifting mechanism

Means are provided for shifting the carriage 16 in either direction from one ordinal position to another by power-driven means controlled by manually operable keys. The shifting mechanism is fully disclosed in my copending application Ser. No. 476,349 wherein sleeve 84 (Fig. 6), rotatably mounted on shaft 85 journalled in the framework of the machine, is rocked counter-clockwise, as viewed from the right, with each depression of the right shift key. Arm 86 secured to one end of sleeve 84 carries pusher link 87, the free end of which is notched to engage the end of right shift push rod 88, so that the rocking of sleeve 84 and arm 86 serves to move the push rod rearwardly to engage the right shift clutch.

The left shift clutch may be engaged manually by a depression of the left shift key or, in certain machine operations, by power-operated means. Sleeve 91 (Fig. 6) rotatably mounted on shaft 85 carries depending arms 92 and 93 disposed at either end thereof. Pin 94 on the lower end of arm 92 abuts the end of left shift pusher rod 95, while arm 93 carries pin 96 for engagement by a notch in the free end of pusher link 97 to control the rearward movement of the pusher rod 95 by means to be hereinafter described. The free end of pusher link 98 (Figs. 6 and 7) is notched to engage pin 94 and at its opposite end is pivotally mounted on the depending end of arm 99 secured on shaft 85, so that with each depression of the left shift key, shaft 85 is rocked counter-clockwise to rock arms 92, 93 counter-clockwise, moving pusher rod 95 rearwardly of the machine to engage the left shift clutch.

Referring to Figs. 6 and 7, any one of several operational control keys serves to enable the operation of power operated means for controlling the engagement of the left shift clutch. In a desired machine operation, a depression of the corresponding control key serves, through means not pertinent to the invention, to impart a clockwise rocking movement to shaft 104 and bellcrank 105 secured thereon. A pin 106 on one arm of bellcrank 105 is engaged in a slot 107 in one end of link 108, and is normally urged to the position shown by spring 109. At its other end, link 108 is pivotally connected to arm 110 of hook member 112 rotatably mounted on eccentric 113 pinned on shaft 114. A second arm 115 of hook member 112 is provided with a hook 116 for cooperation with pin 117 on one arm 118 of bellcrank 119 secured on shaft 120 in a plane adjacent the hook member 112. Shaft 114 is cyclically driven in a conventional manner by the main drive shaft 30 through bevel gearing (not shown). It is thus obvious that the hook member 112 continuously rocks on its eccentric mounting in synchronism with the main drive shaft whenever the driving clutch 31 is engaged and the motor switch is closed.

With the clockwise rocking of shaft 104 (Fig. 7) and bellcrank 105 the leading edge 116 of the hook portion of member 112 is rocked into abutting relation with pin 117 and tensions spring 109. In the initial cycle of rotation of shaft 114 the eccentrically controlled movement of hook member 112 moves the hook 116 to a position above pin 117 for engagement therewith under the urgency of the tensioned spring 109. Further rotation of shaft 114 then serves to rock bellcrank 119 clockwise when pin 121 thereon is engaged by shoulder 122 of latch arm 123 under the urgency of spring 124. Following the engagement of the shoulder 122 with pin 121, the rocking of the eccentrically mounted member 112 is ineffective with respect to bellcrank 119 and is thereafter disengaged therefrom. The bellcrank 119 remains in its latched rocked position until release of the control key when spring 125 (Figs. 2 and 4) urges shaft 104, bellcrank 105 and pin 126 thereon, counter-clockwise (Fig. 7) to release latch 123, thereby permitting restoration of bellcrank 119 to its counter-clockwise rocked position by a well-known spring means. To engage the left shift clutch, the clockwise rocking of bellcrank 119 (Fig. 7) and therefore shaft 120, rocks arm 127 secured thereon in a clockwise direction, which arm 127 serves through a pivotal connection with pusher link 97 to move the link 97 and push rod 95 rearwardly (Fig. 6). For a more complete description of the power control means, reference is to be had to the aforementioned Patent No. 2,650,761.

Zero resetting mechanism

Means are provided in carriage 16 for resetting accumulator numeral wheels 22 and 23 to 0 registration which includes means for restoring any displaced wheels 22 or 23 to 0 position and means for arresting such wheels positively in 0 position. The restoring means includes similar rack bars 132 and 133 (Figs. 1, 2 and 4) mounted for endwise sliding movement in respective carriage frames 60 and 61 adjacent the upper ends of respective numeral wheel shafts 58 and 59. The upper and lower rack of each pair of racks 132, 133 are alternately cut away, as indicated at 134 in Fig. 5, to form a plurality of separate racks for cooperation with respective mutilated gears 135 and 136 on respective numeral wheel shafts 58 and 59. The adjacent ones of the gears 135 and 136 are axially offset on respective numeral wheel shafts 58, 59 to cooperate with the adjacent vertically offset racks formed on rack bars 132 and 133 by similar cut-away portions 134 thereof. When rack bars 132 and 133 are in their normal inactive position, respective gears 135, 136 register with cut-away portions 134 therein so that numeral wheels 22 and 23 can be actuated without interference. If rack bars 132 or 133 are moved to the right, as viewed from the front of the machine, the unmutilated part of respective gears 135, 136 associated with the respective numeral wheels 22, 23 displaced from 0 position will be engaged by the associated racks on bars 132, 133, and such displaced numeral wheels 22, 23 will be rotated until restored to 0 position. It will be noted that any of the numeral wheels 22 or 23 in their 0 position will not be moved by respective rack bars 132, 133 since the mutilated portion of the gears 135, 136 of such numeral wheels face the rack bar, as seen in Fig. 5. For manual operation, rack bars 132 are provided with handle 137 (Figs. 2 and 3), by means of which bars 132 can be actuated against the tension of a suitable spring (not shown) which normally maintains bars 132 in inactive position. Similarly, rack bars 133 are provided with a handle 138 (Figs. 4 and 5) to effect a manual actuation of rack bars 133 against the urgency of a suitable spring (not shown).

The actuation of rack bars 132 and 133 to restore any displaced numeral wheels 22, 23 to 0 position also enables the means for arresting those wheels in such position in a well-known manner. Similar zero stop slides 139 and 140 (Figs. 3 and 5) for the numeral wheels in each register are mounted for limited endwise movement on top of respective carriage frames 60 and 61 by suitable pin-and-slot connections, as indicated at 141 and 142. Each slide 139 and 140 is provided with a respective stop projection 143 and 144 for each of respective numeral wheels 22 and 23 for cooperation with a stop tooth on each of numeral wheel shafts 58 and numeral wheel shafts 59 in the 0 position of numeral wheels 22 and 23. Each of slides 139, 140 are normally held in inactive position by suitable spring means (not shown) so that the projections 143, 144 on the respective slides are out of the path of the associated 0 stop teeth. To provide for movement of projections 143 into the path of the associated 0 stop teeth when zeroizing the numeral wheels 22, bellcrank 145 pivoted at 146 on carriage frame 60 has a bifurcation at its one end for engagement with a pin 147 (Fig. 3) on slide 139, and has cam surface 148 at its other end disposed in the path of roller 149 on resetting actuating slide 150. Bellcrank 151 (Fig. 5) pivoted at 152 on carriage frame 61 has a bifurcation at its one end engaging pin 153 on 0 stop slide 140 and has cam surface 154 at its other end disposed in the path of roller 155 on resetting actuating slide 156 to move the projections 144 into the path of the associated 0 stop teeth when zeroizing numeral wheels 23. Thus, when slides 150 or 156 are actuated to restore respective numeral wheels 22 or 23 to 0 position, 0 stop slides 139 or 140 are moved through the associated bellcranks 145 or 151 to arrest wheels 22 or 23 in such position.

To manually control the movement of rack bars 132 and 0 stop slide 139, upstanding pin 160 is secured to the right-hand end of bars 132 (Figs. 2 and 3), and is engaged in a notch in the forwardly extended portion 161 of actuating slide 150, which is mounted for reciprocating movement on bracket 162 on frame 60 by suitable pin-and-slot connections 163 (Figs. 2 and 9). Pin 160 carries sleeve 164 rotatably mounted thereon to which handle 137 is secured. Sleeve 164 is provided with an abutment arm 165 rotatable into and out of engagement with pin 166 on slide 150 to selectively control the 0 resetting of dials 22, upon movement of slide 150 by other than manually controlled handle 137. Similarly, upstanding pin 167 secured to the right-hand end of bars 133 (Figs. 4 and 5) is engaged in a notch in the web of a channel portion of actuating slide 156 which is mounted for reciprocating movement by suitable means such as similar pin-and-slot connections 168 on carriage frame 61. Handle 138 is secured to sleeve 169 pivotally mounted on the upper end of pin 167, which sleeve is also provided with abutment arm 170 for selective engagement with pin 171 on slide 156 to control the zero resetting of dials 23 upon movement of the slide. Thus, it can be seen that upon actuation of slide 150 or 156 by power-operated means to be described hereinafter, and with the engagement or disengagement of arms 165 and 170 with the respective pins 166 and 171, the zero resetting of dials 22 or 23 may be selectively determined. Each of actuating slides 150 and 156 are normally maintained in inactive position by suitable spring means (not shown).

Revolutions counter resetting means

Means are provided for resetting numeral wheels 79 (Figs. 1, 2 and 3) of the revolutions counter to 0, and as such means is very similar to that described in connection with accumulator numeral wheels 22, a general description thereof will suffice.

Rack bars 175, similar to rack bars 132, are mounted for endwise movement by flanged studs 176 on carriage frame member 60. Axially offset mutilated gears 177 on shafts 178 which carry revolution counter dials 79, are associated with rack bars 175 so that movement of rack bars 175 to the right, as viewed in Fig. 3, serve to restore numeral wheels 79 to 0 position. Racks 175 may be moved to the right manually by means of handle 179 secured to a sleeve 180 pivotally mounted on upstanding pin 181 secured to the right-hand end of racks 175. Dials 79 may be reset to 0 registration by power-operated means when abutment arm 182 secured on sleeve 180 is moved into engagement with pin 183 on the forwardly extending member 161 of actuating slide 150. A 0 stop slide similar to slide 139 is provided for cooperation with stop teeth on dials 79 under the control of racks 175 in a well-known manner. The operation of the above-described zero resetting means is similar to that described in connection with the accumulator resetting means.

Power resetting mechanism

Power-operated means are provided for selectively resetting numeral wheel dials 22 to 0 registration under the control of a zero resetting key 190 (Figs. 2 and 8) or numeral wheel dials 23 to 0 registration under the control of a zero resetting key 191. Such a resetting operation of the numeral wheels in either register is effected in any shifted position of the carriage by similar zero resetting drive members which are normally out of operative relation with the resetting mechanism in the carriage. A complete description will be given herein of the mechanism associated with numeral wheels 22 of the lower register under the control of key 190, while that mechanism associated with numeral wheel dials 23 of the upper register, controlled by key 191, will be described only briefly since the two mechanisms are structurally similar. Zero resetting key 190 serves, upon depression thereof, to enable the drive connection from the actuating means to the zero resetting drive member, to engage the main clutch, and to close the motor switch. Key 190 is mounted for endwise movement by the engagement of a slot 192 with a stud 194 on right frame member 11 and slot 193 engaging stud 195 on auxiliary frame member 196. Key 190 is normally urged to its raised position by a spring 197 and at its lower end is provided with a latching notch 198 for cooperation with a laterally extended elongated end portion 199 of a latching slide 200. In the raised position of key 190, slide 200 has its laterally extended portion 199 engaged with a cam surface 201 on key 190 below notch 198. Slide 200 is mounted for endwise sliding movement on auxiliary frame member 196 by means of a pin 202 engaging a slot at the front end of slide 200 and by a pivotal connection at its rear end with latch-releasing member 203 pivoted at 204 on right frame member 11. A spring 205 tensioned between a pin on frame member 11 and an ear formed at right angles on slide 200 urges the slide to its active position so that, upon depression of key 190, slide 200 will engage latching notch 198 and maintain key 190 in depressed position until release of the latching slide by means to be described hereinafter.

As stated above, depression of key 190 enables a drive connection from the actuating means to the zero resetting drive means. The zero resetting drive means is adapted upon depression of key 190 to effect a zero resetting of the numeral wheel dials 22 in the lower register in any displaced position of the carriage. Such means comprises a plurality of ordinally spaced teeth 210 (Fig. 9) provided in the flange 211 formed at right angles to the actuating slide 150, which flange serves to mount the slide for reciprocatory movement on carriage frame 60 by means of similar pin-and-slot connections 163 at either end thereof. In each ordinal position of the register carriage, a tooth 210 is operatively positioned for engagement by an ear 212 formed at right angles to a slide 213 mounted for endwise reciprocating movement by means of a slot 214 engaging a pin 215 on an upwardly extended portion 216 of transverse bracket 12. It will be noted that ear 212, in its inactive position shown in Fig. 9, is below teeth 210 to provide for unimpeded shifting of the carriage. The normally inactive position of the ear 212 is determined by the position of the pin 215 in the angularly upwardly extended right-hand end of slot 214. As viewed in Fig. 9 with the carriage in its leftmost position, it can be seen that in the first part of the reciprocation of slide 213, pin 215 will serve to cam ear 212 upwardly and into engagement with shoulder 217 on actuator slide 150 to move the slide to the right.

To effect a reciprocating movement of ear 212, slide 213 is pivotally mounted at its right end at 218 (Fig. 9) on a horizontally extended end of one arm 219 of a bellcrank 220 pivotally mounted on a pin 221 on transverse bracket 12. The other arm 222 of bellcrank 220 extends laterally beyond right side frame 11 and pivotally supports the upper end of a link 223 at 224. At its lower end, link 223 carries a pin 225 engaged in one slot 226 of a pair of slots having their upper ends oppositely angularly disposed in a distended vertical arm 227 of a bellcrank 228 pivoted at 229 on a bracket 230 secured on right side frame member 11. Slide 213 is normally urged to its left-hand or inactive position and pin 225 is therefore resiliently urged to the upper end of slot 226 by a spring 231 secured at its one end on pin 225 of link 223 and at its other end on a stud on right side frame member 11. A notch 235 is provided in link 223 adjacent the lower end thereof, and is normally engaged by a roller 236 on the rightmost end of an arm 237 (Fig. 9) pivoted at 238 on a depending bracket 239 secured to transverse bracket 12. A spring 240 is secured at its one end to a horizontally disposed arm 241 of bellcrank 228 and at its other end to a pin on auxiliary side frame member 242 and serves to normally urge bellcrank 228 in a counter-clockwise direction, as viewed in Fig. 9, to maintain notch 235 of link 223 in engagement with roller 236 of arm 237. An arm 243 extends upwardly of arm 237 intermediate the ends thereof and carries a roller 244 for active participation with a cam 245 integrally mounted with a gear 246 rotatably mounted on a stud 247 on transverse bracket 12. Gear 246 is enmeshed with a gear 248 having its hub 249 secured on the forward end of a stub shaft 250 (Fig. 10). Hub 249 serves as a journal for gear 248 in transverse bracket 12 while the other end of shaft 250 is journalled in a transverse bracket 251 supported in the framework of the machine.

Figure 12:
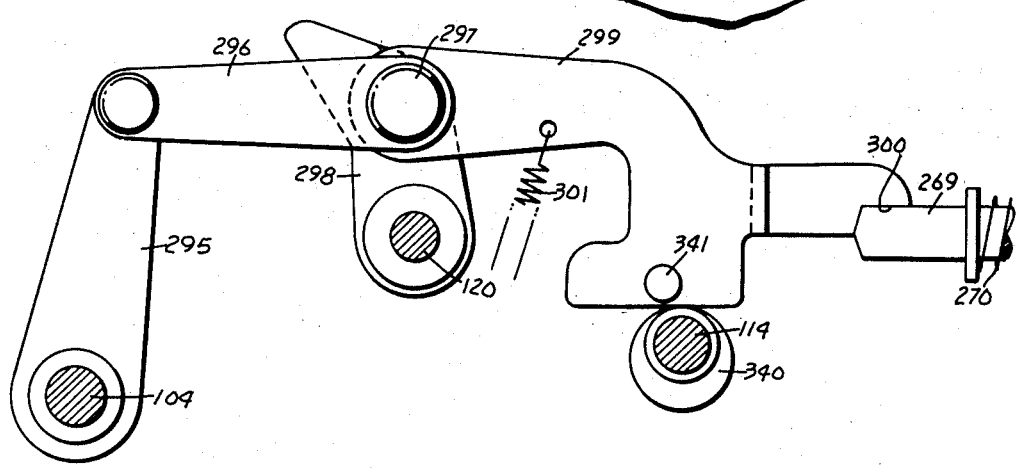
Fig. 12 is an elevational view of the zero resetting initiating mechanism and the cyclic disabling means therefor, the view being taken on line 12—12 of Fig. 6.

Thus, it is readily apparent that upon each clockwise cyclic rotation of cam 245 (Fig. 9), arm 237 is rocked clockwise about its pivot 238 against the urgency of a relatively strong spring 252 when roller 236 on arm 237 serves to move link 223 downwardly to impart a clockwise rotation to bellcrank 220, thereby moving slide 213 to the right to effect a corresponding movement to actuating slide 150 in any shifted position of the carriage. Selectively operable drive means are provided to control the cyclic rotation of cam 245 and for this purpose the lowest order actuating shaft 29 (Fig. 10) is extended rearwardly and has a collar 258 secured adjacent the end thereof. Collar 258 is provided with diametrically opposed slots slidably engaged by corresponding teeth 259 on the forward end of a shiftable drive-establishing collar 260 slidably mounted on the end of shaft 29. On the opposite end thereof collar 260 carries an arcual tooth 261 adapted for engagement with a corresponding tooth 262 on gear hub 249. The sliding engagement of the collar 260 with gear hub 249 is controlled by an arm 263 (Figs. 9 and 10), which is bifurcated at its upper end for engagement with an annular flange 264 on collar 260, and at its lower end is pinned on a shaft 265, journalled at either end in frame members 10 and 11. Adjacent the left end thereof, as viewed in Fig. 9, shaft 265 carries an upright arm 266 (Fig. 11) similar to arm 263 and having its upper end bifurcated to receive an annular flange 267 of a collar 268 pinned on the rearward end of a push rod 269 supported for endwise sliding movement adjacent its forward end in transverse bracket 14, similarly to that of left shift push rod 95 (Fig. 7) and intermediate its ends in transverse bracket 13. Rod 269 is normally urged to its forward position by a spring 270 (Figs. 6 and 12) in the same manner as rod 95 of the carriage shifting mechanism, as seen in Fig. 7.

A depression of key 190 serves to move push rod 269 rearwardly to impart a clockwise rotation to shaft 265 (Fig. 11) thereby rocking arm 263 (Figs. 9 and 10) to engage tooth 261 of collar 260 with tooth 262 of gear hub 249 to effect a resetting of numeral wheel dials 22 to 0 registration upon engagement of the main clutch and closing of the motor switch. The engagement of resetting clutch 261, 262, the main clutch 31, and the closing of the motor switch are effected substantially simultaneously. Referring to Figs. 2, 6, 8, 12 and 13, a pin 275 on key 190 overlies the rearwardly extended arm 276 of a bellcrank 277 pivoted at 278 on right side frame member 11. The rearward end of arm 276 is U-shaped to provide an extension 279 which underlies a pin 280 on key 191 for selective control of bellcrank 277 by key 191 as will be described hereinafter. A depending arm of bellcrank 277 is pivoted at 281 to the forward end of a link 282, the rearward end of which is slotted to engage a pin 283 intermediate the ends of an arm 284 pivoted at 285 on side frame member 11. At its lower end arm 284 carries a pin 286 for engagement with a cam surface 287 of the horizontally disposed end 288 of an arm 289 secured to one end of shaft 104 (Figs. 2, 4 and 13). A spring 290 normally serves to maintain arm 276 of bellcrank 277 and the extension 279 thereof in engagement with respective pins 275 and 280 on keys 190, 191. Similarly, a spring 291 normally maintains pin 283 of arm 284 in engagement with the rearward end of the slot in link 282.

To enable the engagement of the zero resetting clutch, shaft 104 carries an upright arm 295 adjacent the left end thereof (Figs. 6 and 12), which arm has a pivotal connection with one end of a link 296, the other end of which is pivotally mounted on a pin 297 on an arm 298 mounted for oscillating movement on shaft 120. The left-hand or forward end of a pusher link 299 is also pivoted on pin 297 of arm 298 and at its rearwardly offset end is provided with a notch 300 for engagement with the end of push rod 269. Notch 300 is normally maintained in engagement with push rod 269 by means of a spring 301.

As stated hereinbefore, a depression of key 190 serves also to engage the main clutch 31 and close the motor switch. For this purpose, arm 306 is pinned on shaft 104 for rocking movement therewith and carries roller 307 (Fig. 13) engaging cam surface 308 of one arm 309 of lever 310 pivotally mounted on shaft 120. The end portion 311 of the other arm 312 of lever 310 is angularly disposed relative thereto for camming engagement with pin 313 on the lower end of lever 314 (Figs. 2 and 4) pivoted at 315 on side frame member 11. Pin 313 extends through an aperture in side frame member 11 and provides a pivotal connection for link 316 (Fig. 13), the rightward movement of which functions in a conventional manner to close the motor switch. At its upper end lever 314 (Figs. 2 and 4) is pivotally connected to one end of the link 317, the other end of which is pivoted on clutch control lever 38 to control the clockwise rocking movement thereof against the urgency of spring 125. It becomes readily apparent, therefore, that upon depression of key 190, shaft 104 is rocked clockwise in Figs. 2 and 12 and counter-clockwise as viewed in Fig. 13, to move pusher rod 269 to the right to engage the zero resetting clutch. Substantially simultaneously therewith, arm 306 on shaft 104 serves to move link 316 to the right, as viewed in Fig. 13, and to rock lever 314, clockwise in Fig. 2, to close the motor switch and to effect engagement of the main clutch 31.

It will be recalled that the clockwise rocking of shaft 104 (Fig. 7) serves to rock hook 116 clockwise for engagement with pin 117 on bellcrank 119 secured to shaft 120, so that upon cyclic rotation of shaft 114, shaft 120 is rocked in a clockwise direction to move pusher link 97 rearwardly (Fig. 6) to engage the left shift clutch of the carriage shifting mechanism. Consequently, pusher link 97 must be disabled, upon depression of key 190 to effect a 0 registration in numeral wheel dials 22 of the lower register without initiating an operation of the carriage left shifting mechanism. Referring now to Figs. 4, 6 and 13, to rock pusher link 97 out of engagement with pin 96, a pin 320 is provided on link 282 supporting one end of spring 290 and is adapted for engagement with the cam edge of an arm 321 extending upwardly at a right angle to a lateral extension 322 of one arm 323 of a bail 324 rockably mounted on a shaft 325 journalled at its respective ends in control frame member 11 and bracket 337 secured on transverse bracket 14. The other arm 326 of bail 324 is pivotally connected to the lower end of a link 327 which, at its upper end is pivoted on a bell crank arm 328 of a bail 329 (Figs. 6 and 13) rockably mounted on shaft 120. An arm 330 of bail 329 extends rearwardly and is provided with an elongated lengthwise slot in the free end thereof engaging a pin 331 on an extended arm 332 of a bail 333 rockably mounted on shaft 120. An ear 334 is formed at right angles to the free end of arm 332 and is positioned beneath a depending rearwardly extended arm 335 of pusher link 98 for operative engagement therewith. The other arm 336 of bail 333 is provided with a laterally extended ear 337 underlying pusher link 97 to control a counter-clockwise rocking movement thereof, as viewed from the right in Fig. 6. Thus, depression of key 190 and the leftward movement of link 282 (Fig. 4) imparts a clockwise rotation to bails 324 and 329 (Fig. 13) and a counter-clockwise rotation to bail 333 (Figs. 6 and 7) raising the notched end of pusher link 97 out of engagement with pin 96 to prevent the initiation of a left shift of the carriage upon rocking of shaft 120. Similarly, ear 334 of bail 333 disables pusher link 98 with respect to the left shift pusher rod 95 for reasons not pertinent to the invention and therefore not described herein.

After 180° of the zero resetting cycle, a cam 340 on shaft 114 (Figs. 6 and 12) is effective by engagement with a pin 341 on depending portion of pusher link 299 to raise the notch 300 thereof out of engagement with the end of pusher rod 269. However, clutch members 261 and 262 are frictionally maintained in engagement until near the end of the cycle due to the load imposed thereon. The structural shape of the cam 245 is such that immediately prior to the end of the cycle, arm 237 and therefore roller 244 become effective under the urgency of the relatively strong spring 252 to rotate cam 245 and therefore tooth 262 ahead of the driving tooth 261 releasing the frictional bond therebetween when spring 270 becomes immediately effective to restore pusher rod 269 to its normally inactive position, thereby disengaging the zero resetting clutch.

To enable the release of the key 190 to its normally raised position under the urgency of spring 197 (Fig. 2), the rearwardly extended offset end 342 of latch-releasing lever 203 is positioned in a manner such that it is engaged by arm 237 as the arm is rocked clockwise (Figs. 2 and 9) into its extreme position, thereby moving link 200 forwardly of the machine to release the end portion 199 from its engagement with the shoulder 198 of key 190.

The resetting of the numeral wheels 23 in the upper register to 0 registration is selectively controlled in much the same manner as the zero resetting of the numeral wheels 22, wherein a rack 345 integral with actuating slide 156 (Figs. 4, 5 and 9) is mounted at each end for reciprocation on carriage frame 61 by pin-and-slot connections 168 similar to pin-and-slot connections 163. Rack 345 lies in a plane parallel with and adjacent to rack 211 and is provided with a plurality of ordinally spaced teeth 346 similar to teeth 210 of rack 211, one tooth for each ordinal position of the carriage 16. Teeth 346 are positioned for operative relation with a lateral actuating extension 347 on a slide 348 structurally similar to slide 213 and mounted for endwise movement on pin 215 adjacent to and parallel with slide 213. Extension 347 is normally positioned below teeth 346 to enable uninterrupted shifting of the carriage. Pin 215 serves upon reciprocation of slide 348 in cooperation with a slot similar to the slot 214 in slide 213, to cam extension 347 into active position for engagement with a corresponding tooth 346. A bellcrank 349 is also pivoted on pin 221 adjacent to and parallel with similar bellcrank 220 and has a pivotal connection at 350 with slide 348. To control a rocking movement of bellcrank 349 for reciprocation of slide 348, a link 351 is pivotally supported at 352 on a laterally extended arm of bellcrank 349. The lower offset end of link 351 is provided with a notch 353 opposed to and aligned with notch 235 of link 223 for selective engagement with pin 236 on arm 237.

The selective engagement of the notch 353 with pin 236 is controlled by a pin 354 on the lower end of link 351 engaged in an angularly disposed slot 355 in the distended arm 227 of bellcrank 228, which pin-and-slot connection is effective upon clockwise rocking of bellcrank 228 (Fig. 9) to rock link 351 counter-clockwise about its pivot 352 on bellcrank 349. Link 351 and therefore slide 348 are normally urged to the inactive position shown by a spring 356 secured at its one end to pin 354 and at its other end on a spring stud on side frame member 11 resiliently maintaining pin 354 in the upper end of slot 355.

Key 191 (Figs. 4 and 8) serves upon depression thereof to impart a clockwise rotation to bellcrank 228 (Fig. 9), from the normal position shown, to engage notch 353 with roller 236 for control of link 351 by the clockwise rocking movement of arm 237. Key 191 is mounted for endwise sliding movement on side frame member 360 by the engagement of slots 361 with studs 362 thereon. At its lower end, key 191 is provided with a latching notch 363 for engagement by end portion 199 of latching slide 200. Intermediate its ends, key 191 has a camming surface 364 engaging a roller 365 on one arm 366 of a bellcrank 367 pivotally mounted on a stud 368 on side frame member 360. The other arm 369 of bellcrank 367 is pivotally mounted on the forward end of a link 370 which, at its rearward end, is connected to the depending arm of a lever 371 pivoted on side frame member 360 at 372. At its rearward end lever 371 is pivoted on the upper end of a link 373 having a laterally extending ear at its lower end pivoted at 374 on arm 241 (Fig. 9) of bellcrank 228. A spring 375 normally maintains key 191 in its raised position while spring 240 normally urges bellcrank 228 in a counter-clockwise direction to retain roller 365 in engagement with camming surface 364. Therefore, it becomes readily apparent that upon depression of key 191 cam 364 rocks bellcrank 367 clockwise (Fig. 4) to move link 370 forwardly of the machine thereby imparting a clockwise rotation to lever 371 and bellcrank 228 (Fig. 9). The depression of key 191 also serves through pin 280 thereon and extension 279 to rock bellcrank 277 clockwise (Figs. 4 and 8) to engage the zero resetting clutch and the main clutch, and to close the motor switch, as hereinbefore described.

Referring to Figs. 2, 4 and 8, means are provided for preventing the depression of key 191 upon depression of key 190 or vice versa and for this purpose a bail 380 is positioned between the keys 190 and 191 having one arm 381 thereof pivoted on stud 194 in right side frame member 11 and having the other arm 382 pivoted on the upper stud 362 on frame member 360 axially aligned with stud 194. A radial indentation is provided in the rearward edge of arm 381 to partially encompass pin 275 and has a cam surface 383 for cooperative engagement by pin 275 to rock bail 380 clockwise, as viewed in Fig. 2, upon depression of key 190. Arm 382 of bail 380 is provided with a similar radial indentation in the forward edge thereof and in opposition to the indentation in arm 381 for cooperation with pin 280 on key 191. A cam surface 384 (Fig. 4) tangential with the radial indentation of arm 382 cooperates with pin 280, upon depression of key 191, to impart a counter-clockwise rotation to bail 380. In the normally raised position of keys 190 and 191, sufficient clearance is provided between the inner radial portion of each indentation and the corresponding respective pins 275, 280 to permit a full depression of either key 190 or 191. In the depressed position of either key 190 or 191, the respective pin 275 or 280 is moved into blocking relation with the rearward edge of arm 381 or the forward edge of arm 382. Thus, it can be seen that upon depression of key 190 pin 275 rocks bail 380 (Fig. 2) clockwise to rock the indentation in arm 382 into engagement with pin 280 on key 191, which bail 380 is then blocked against further movement upon full depression of key 190. Conversely, upon depression of key 191, pin 280 thereon (Fig. 4) imparts a counter-clockwise rotation to bail 380 thereby preventing a depression of key 190.

It will be recalled that after 180° of each resetting cycle, cam 340 (Fig. 12) on cyclically operable shaft 114 cooperates with pin 341 to raise the notch 300 of pusher link 299 out of engagement with pusher rod 269 and, near the end of the cycle, the free end of arm 237 (Fig. 9) is effective to engage the rearward offset end 342 of lever 203 (Fig. 4) to disengage the lateral extension 199 from engagement with the respective latching tooth 198 or 363 of the depressed key 190 or 191. The respective springs 197 or 375 will then effect the return of the depressed key to its raised position thereby enabling restoration of the resetting mechanism to its normally inactive position including the reengagement of the notch of pusher link 299 with the end of pusher rod 269. However, if either key 190 or 191 is maintained depressed, lateral extension 199 would normally immediately reengage respective teeth 198 or 363 upon termination of the resetting cycle and since pusher link 299 is therefore held in its rightwardly moved position (Fig. 12) with notch 300 out of engagement with pusher rod 269, resetting cam 245 is not effective in the second or succeeding cycles to release latching slide 200.

To prevent re-engagement of lateral extension 199 of latching slide 200 with either of teeth 198 or 363, each of keys 190, 191 are provided with respective secondary latches 385, 386 (Figs. 2, 4 and 8) mounted for endwise movement on keys 190 and 191 by slots engaging respective pins 387 and 388 and are normally urged by respective springs 389, 390 to the position shown. Each latch member 385 and 386 is provided with a notch at its lower end, the respective leading edges 391 and 392 of which are positioned forwardly or to the left of the tip of respective latching teeth 198 and 363. The spacing between the latching teeth 198 and 363 of each key 190, 191 and the lower end of the respective latch slides 385 and 386 is sufficiently less than the width of the lateral extension 199 to permit the respective springs 389 and 390 to be tensioned upon depression of the corresponding key. Hence, upon a partial depression of either key 190 or 191, the lower end of the associated latch slide 385 or 386 engages the lateral extension 199 and, upon further depression of the key, is moved upwardly tensioning the corresponding spring 389 or 390. At the end of the resetting cycle, when latch slide 200 and therefore ear 199 is moved to the left in Figs. 2 and 4 to release the depressed key 190 or 191, the effectively tensioned spring 389 or 390 moves the associated latch member 385 or 386 downwardly so that the notch 391 or 392 engages the ear 199 thereby maintaining latch slide 200 in its forwardly moved position. It is therefore readily apparent that even though the key is maintained depressed, re-engagement of the lateral extension 199 with the latching tooth 198 or 363 of the respective key 190 or 191 cannot be effected.

We claim:

1. In a calculating machine, a shiftable carriage, a register in said carriage, a source of power, means for shifting said carriage driven by said source of power, means for resetting said register driven by said source of power, a power-operated means for effecting operation of said shifting means, a control means for enabling the operation of said power-operated means and said resetting means, said last-named means including a plurality of control keys, and means controlled by one of said keys upon manipulation thereof to disable said power-operated means thereby preventing operation of said shifting means.

2. In a calculating machine, a shiftable carriage, a register in said carriage, a source of power, means for shifting said carriage driven by said source of power, means for resetting said register driven by said source of power, a power-operated means normally adjusted to effect operation of said shifting means, means for enabling the operation of said power-operated means, a normally inactive means rendered operable by said enabling means to effect operation of said resetting means, means for controlling the operation of said enabling means including a key, and means controlled by said controlling means for adjusting said power-operated means to prevent operation of said shifting means upon manipulation of said key.

3. In a calculating machine, a carriage shiftable ordinally to a plurality of operating positions, a register in said carriage, a source of power including a cyclically operable clutch, means for shifting said carriage, a power-operated means driven by said cyclically operable clutch normally operable to initiate operation of said shifting means, a resetting means shiftable with said carriage and actuatable to reset said register to 0 registration, means driven by said clutch for actuating said resetting means in any operating position of said carriage, means for controlling the operation of said driven means, control means operable to engage said clutch and to enable the operation of said controlling means, and means rendered operable by said control means to disable said power-operated means thereby preventing operation of said shifting means.

4. In a calculating machine, a carriage shiftable ordinally to a plurality of operating positions, a register in said carriage, a source of power including a cyclically operable clutch, means for shifting said carriage, a power-operated means driven by said cyclically operable clutch operable to initiate operation of said shifting means, means movable to effect a resetting of said register, means associated with said register for control by said movable means to zeroize said register in any operating position of said carriage, a resetting clutch, means operable by said cyclically operable clutch upon engagement of said resetting clutch to actuate said movable means, means adjustable to effect engagement of said cyclically operable clutch and said resetting clutch and to initiate operation of said power-operated means, a plurality of control means for adjusting said adjustable means, said last-named means including a resetting key operable to disable said power-operated means, a latch means for said resetting key, and means operated by said actuating means effective to release said latch means subsequent to the operation of said movable means.

5. In a calculating machine having a frame, a carriage shiftable on said frame to a plurality of operating positions, numeral wheels in said carriage, means for shifting said carriage transversely to said frame, a cyclically operable drive means on said frame, a power-operated means driven by said cyclic drive means effective to control said shifting means, means for initiating operation of said cyclic drive means and said power-operated means, and means for resetting said numeral wheels to 0 registration in any shifted position of said carriage, the combination comprising a resetting member associated with said numeral wheels movable to an active position, a plurality of teeth on said member, one for each operative position of said carriage, a reciprocating member operable upon actuation thereof to engage a selective one of said teeth to effect a movement of said resetting member, a cam-operated means for controlling the operation of said reciprocating member, a clutch driven cyclically by said drive means operable upon engagement thereof to control the operation of said cam-operated means, a resetting key, normally connected means operable by said initiating means to effect engagement of said clutch upon operation of said key, means for latching said key in operated position, means controlled by said key upon operation thereof to disable said power-operated means, a cam driven by said cyclic drive means operable in timed relation to the operation of said cam-operated means to disconnect said connected means to effect a disengagement of said clutch, and means controlled by said cam-operated means to release said latching means subsequent to the operation of said resetting member.

6. In a calculating machine having a frame, a carriage shiftable transversely of said frame to a plurality of operating positions, a first and second series of numeral wheels in said carriage, a cyclic drive means, means associated with each of said series of numeral wheels selectively operable to reset the corresponding numeral wheels to 0 registration, the combination comprising a control key for each of said resetting means, a movable means for each of said resetting means, each being operable upon movement thereof to cause actuation of the corresponding resetting means, a cam-operated means, a normally inoperative means engageable with said cyclic drive means to control the operation of said cam-operated means, means normally positioned for actuation by said cam-operated means to control the movement of one of said movable means upon manipulation of one of said keys, means adjustable relative to said cam-operated means to control the movement of the other of said movable means upon manipulation of the other of said keys, means controlled by the manipulation of said other of said keys for inactively positioning said positioned means and adjusting said adjustable means, and means controlled by either of said keys for initiating operation of said cyclic drive means and engaging said engageable means.

7. In a calculating machine, a carriage, a plurality of registers in said carriage, a series of numeral wheels in each of said registers, cyclically operable actuating means for said registers, drive means for said actuating means including a source of power and a cyclically operable clutch providing the only path of power flow from said source of power, a resetting means for each of said series of numeral wheels in said registers, a power-operated means including a normally disabled drive connection with said actuating means, a control member for each of said resetting means selectively operable for engagement and disengagement with said power-operated means, and means operable to control the engagement and disengagement of said control members, to effect engagement of said cyclically operable clutch, and to enable the said drive connection.

8. In a calculating machine, a carriage, a plurality of registers in said carriage, a series of numeral wheels in each of said registers, cyclically operable actuating means for said registers, drive means for said actuating means including a source of power and a cyclically operable clutch providing the only path of power flow from said source of power, a resetting means for each of said series of numeral wheels, a control member for each of said resetting means, a power-operated means for either of said control members, a normally disabled drive connection with said actuating means for driving said power-operated means, adjustable means for controlling the positioning of said control members relative to said power-operated means and normally biased to engage one of said members with said power-operated means, manually operable control means operable to effect the engagement of said cyclically operable clutch and to enable said drive connection, and means selectively operable by said manually operable means to adjust said adjustable means to effect the engagement of the other of said control members with said power-operated means.

9. In a calculating machine, a carriage, a first and second register in said carriage, a series of numeral wheels in each of said registers, cyclically operable actuating means for said registers, drive means for said actuating means including a source of power and a cyclically operable clutch, a resetting member for each of said series of numeral wheels operable upon actuation thereof to reset the associated numeral wheels to "0" registration, an actuator member for each of said resetting members, a control member for each of said actuators selectively operable to control the movement thereof, a cam-operated means for controlling the selective operation of either of said control members, a normally disabled drive connection with said actuating means for driving said cam-operated means, adjustable means for controlling the engagement of either of said control members with said cam-operated means, means normally biasing said adjustable means to one position to engage one of said control members with said cam-operated means, a control key for each of said registers operable to initiate a resetting operation therein, means operable by either of said keys upon manipulation thereof to effect engagement of said cyclically operable clutch, a connecting means operated by said clutch-engaging means to enable said drive connection, and means controlled by one of said keys for adjusting said adjustable means to engage the other of said control members with said cam-operated means.

10. In the apparatus of claim 9, a latch means for engagement with either of said keys to retain said keys in manipulated position, means operable by said cam-operated means to release said latch means subsequent to the operation of the selected one of said resetting members, and a cam means driven by said drive means effective in timed relation to said actuating means to disconnect said connecting means.

11. In the apparatus of claim 10, a blocking member on each of said keys operable for adjustment by said latch means upon engagement with a corresponding manipulated key, and a spring means for each blocking member effective to move an adjusted one of said blocking members into blocking relation with said latch means upon release thereof by said latch-releasing means thereby preventing re-engagement of said latch means with said manipulated key.

12. In a calculating machine, a carriage, a plurality of registers in said carriage, an actuating means for said registers, a cyclically operable drive means for said actuating means, a resetting means for each of said registers, a power-operated means movable from an inactive to an active position to control the operation of said resetting means, said last-named means including a normally disabled drive connection with said actuating means, means positionable to connect said drive connection with said actuating means, manually operable means for initiating operation of said cyclically operable drive means and positioning said connecting means, a resetting control means for each resetting means selectively operable for engagement and disengagement with said power-operated means in accordance with the operation of said manually operable means, means driven by said cyclically operable drive means for cooperation with said connecting means in timed relation to the operation of said power-operated means to enable restoration of said drive connection to its normally disabled position, a latch means engageable with said manually operable means upon operation thereof and operable to be disengaged therefrom by said power-operated means in its actively-moved position, and yieldable means conditioned by said manually operable means upon operation thereof to block re-engagement of said latch means with said manually operable means upon disengagement of said latch means.

13. In a calculating machine, a register, a source of power, means for resetting said register driven by said source of power, means driven by said source of power to effect another machine operation including a power-operated means, a control means for enabling the operation of said power-operated means and said resetting means, said last-named means including a plurality of control keys, and means controlled by a selected one of said keys upon manipulation thereof to disable said power-operated means.

14. In a calculating machine, a shiftable carriage, a register in said carriage, a source of power, means driven by said source of power for resetting said register, a power-operated means normally adjusted to effect another machine operation, means for enabling the operation of said power-operated means, means rendered operable by said enabling means to effect operation of said resetting means, means for controlling the operation of said enabling means including a key, and means controlled by said controlling means for adjusting said power-operated means from its normal position upon manipulation of said key.

15. In a calculating machine having a carriage ordinally positionable in a plurality of operating positions, a register in said carriage, a source of power including a cyclically operable clutch, and means for resetting said register the combination comprising, means movable to effect operation of said resetting means in any operating position of said carriage, a resetting clutch, control means operable to effect engagement of said cyclically operable clutch, adjustable means normally positioned to effect engagement of said resetting clutch upon operation of said control means, means operable by said cyclically operable clutch upon engagement of said resetting clutch to actuate said movable means, and means driven by said cyclically operable clutch effective during the cyclic operation thereof to adjust said adjustable means causing disengagement of said clutch.

16. In apparatus of the character described in claim 15 having a manually operable key for enabling operation of said control means, a latch means for said key, and means operated by said actuating means effective to release said latch means subsequent to the operation of said movable means and said driven means.

17. In a calculating machine, a frame, a register on said frame, a series of numeral wheels in said register, a cyclically operable drive means on said frame, a toothed member associated with said register movable to an active position to reset all said numeral wheels to 0 registration when displaced therefrom, a reciprocating member operable upon actuation to engage said toothed member to effect movement thereof, a cam-operated means for controlling the operation of said reciprocating member, a resetting clutch driven cyclically by said drive means operable upon engagement thereof to control the operation of said cam-operated means, normally connected means operable to effect engagement of said resetting clutch, a power-operated means driven by said cyclically operable drive means normally operable to control another machine operation, a manually operable key, means controlled by said key upon manipulation thereof to effect operation of said cyclic drive means, said power-operated means, and said normally connected means, means actuated by said key to disable the operation of said power-operated means, means for latching said key in operated position, a cam driven by said cyclic drive means operable in timed relation to the operation of said cam-operated means to disconnect said connected means thereby effecting a disengagement of said resetting clutch, and means controlled by said cam-operated means to release said latching means subsequent to the operation of said reciprocating member.

References Cited in the file of this patent
UNITED STATES PATENTS
2,329,649    Pinyan _____ Sept. 14, 1943